Nov. 10, 1953   C. A. TREXEL   2,658,353
APPARATUS AND METHOD FOR THE PLACEMENT OF CAISSONS
Filed Aug. 15, 1950   2 Sheets-Sheet 1
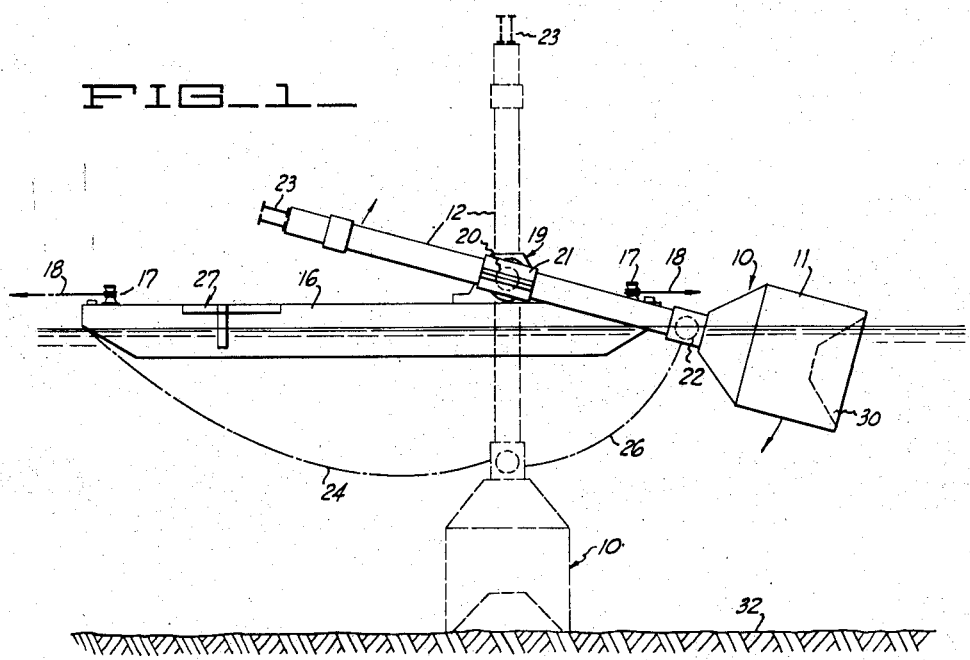
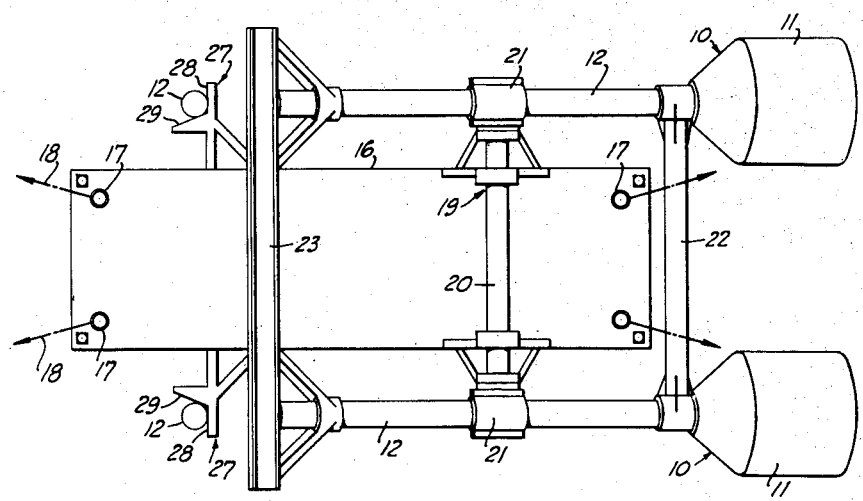
INVENTOR.
Carl A. Trexel
BY
ATTORNEYS Nov. 10, 1953     C. A. TREXEL     2,658,353
APPARATUS AND METHOD FOR THE PLACEMENT OF CAISSONS
Filed Aug. 15, 1950     2 Sheets-Sheet 2
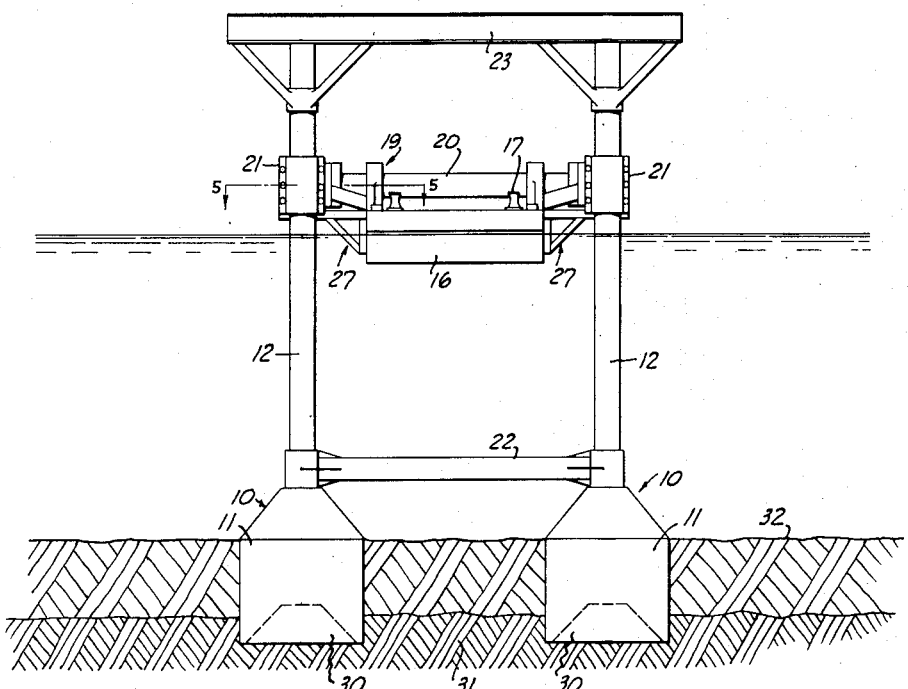
FIG_3_
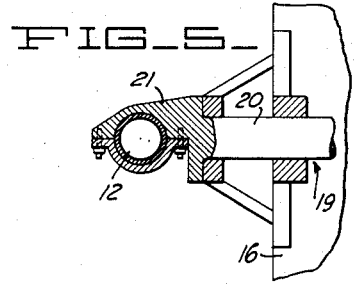
FIG_5_
FIG_4_
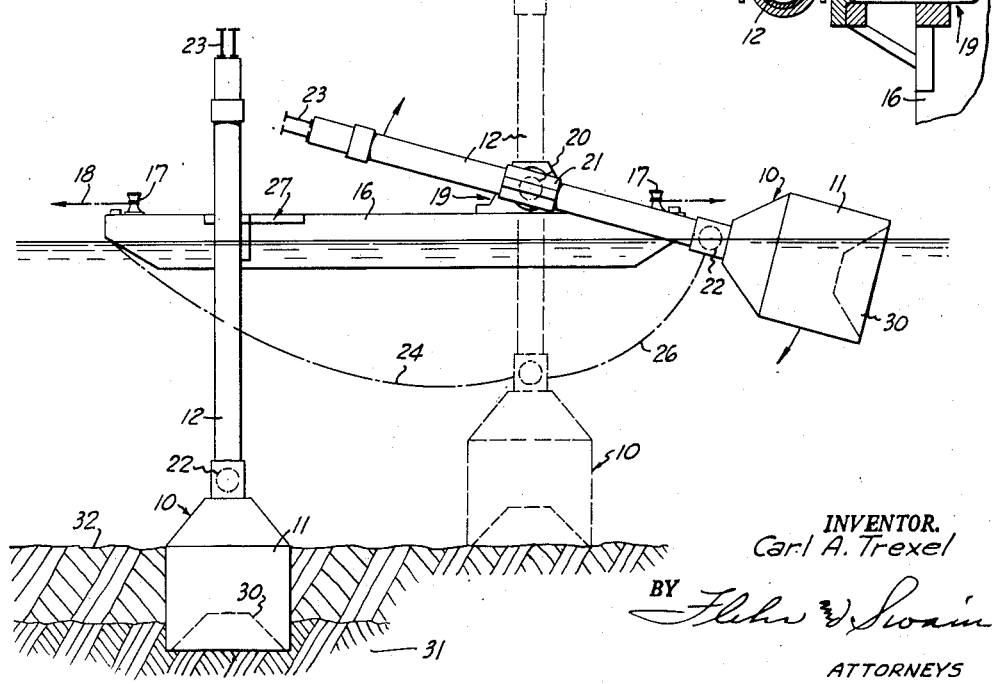
INVENTOR.
Carl A. Trexel
BY
ATTORNEYS Patented Nov. 10, 1953

2,658,353

UNITED STATES PATENT OFFICE 2,658,353

APPARATUS AND METHOD FOR THE PLACEMENT OF CAISSONS

Carl A. Trexel, San Francisco, Calif., assignor to Ben C. Gerwick, Inc., San Francisco, Calif., a corporation of California Application August 15, 1950, Serial No. 179,413

9 Claims. (Cl. 61—46)

This invention relates generally to apparatus and methods for placement of caissons and is particularly applicable where one or more caissons are required to support an offshore working platform or other superstructure.

In copending application Serial No. 81,008 filed March 11, 1949, and entitled "Submarine Support Column," there is disclosed a caisson structure suitable for supporting offshore working platforms or other superstructures. The caisson in that instance consists of a base portion of substantial size and weight, and a column portion rigidly attached to the base portion and of such length as to extend above the surface of the water. The base portion is hollow and divided into a plurality of compartments which are adapted to be progressively flooded. Such a caisson is fabricated on shore and then floated in substantially horizontal position to the location where it is desired to provide a working platform. The compartments are then progressively flooded under controlled conditions, whereby the caisson gradually turns from horizontal to vertical position, and is then lowered to seat upon the bottom formation.

In many instances it is desirable to use a plurality of such caissons to support a working platform. In such event it is important to accurately locate the caissons with respect to each other. Thus assuming that four or more caissons are used for one platform, their respective axes should be vertical and coincident with predetermined centers as viewed in plan. It will be evident that such accurate positioning greatly facilitates erection of the upper platform or other superstructure, and permits prefabrication of all or substantial parts of such superstructure before applying the same to the caissons. In general the accurate location and alignment of two or more such caissons presents a difficult problem, and one which is aggravated by such factors as wind, water currents, and wave action.

It is an object of the present invention to provide a novel apparatus and method which facilitates accurate positioning and location of caissons of the type described above.

Another object of the invention is to provide an apparatus particularly adapted for use with caissons of the type disclosed in said application Serial No. 81,008, and which facilitates the accurate positioning of a plurality of such caissons preparatory to the erection of an offshore superstructure.

Further objects of the invention will appear from the following description in which the preferred embodiment of the invention has been set forth in detail in conjunction with the accompanying drawing.

Referring to the drawing:

Figure 1 is a side elevational view showing apparatus incorporating the present invention, and illustrating the use of such apparatus in the placement of caissons.

Figure 2 is a plan view of the apparatus shown in Figure 1.

Figure 3 is an end view of the apparatus shown in Figure 1, and showing caissons resting upon a bottom formation.

Figure 4 is a view like Figure 1 but showing the apparatus being used for the placement of caissons with accurate alignment and predetermined spacing with respect to caissons which have been previously positioned.

Figure 5 is a cross-sectional detail on an enlarged scale taken along the line 5—5 of Figure 3.

In Figures 1 and 2 of the drawing I have shown caissons 10 which can be constructed substantially as disclosed in said copending application Serial No. 81,008. Briefly each caisson consists of a base portion 11 and an extended column portion 12. The base portion can be made of suitable material such as reinforced concrete, and should be of sufficient weight and size to firmly rest upon an underlying bottom formation. The column portion 12 can be cylindrical in form and made of suitable steel conduit. The column portion is of relatively small diameter compared to the base portion, whereby it affords minimum resistance to water current and wave action.

As disclosed in said copending application 81,008, the interior of the base portion 11 of each caisson is hollow and is divided into a plurality of longitudinally spaced compartments, by the provision of suitable partitions or bulkheads. The various compartments are connected with piping extending through the column portion 12, whereby the compartments can be progressively flooded with water at a controlled rate. Likewise for salvage purposes it is desirable to provide for expelling the water from the compartments, either by pumping through the piping, or by displacing water by use of compressed air. When the compartments are empty the caisson is buoyant and can be floated in a general horizontal position. However when the compartments are flooded the weight of the caisson is sufficient to hold it in stable vertical position with its base resting upon a bottom formation.

My apparatus for the positioning of such caissons consists of a barge or pontoon 16, which is preferably provided with conventional means for holding it in a desired location. Thus it is shown provided with capstans or winches 17 which are engaged by the anchor chains or cables 18. Intermediate its ends the barge is provided with trunnions 19 which serve to support the horizontal shaft 20 and the caisson engaging devices 21 mounted upon the same. Devices 21 can be in the form of collar-like clamps embracing the column portions 12 of the caissons. Preferably they can be tightened to firmly grip the column portions, or loosened to permit the column portions to slide through the same. Also these devices should be completely releasable from the caissons, after a positioning operation.

In addition to the parts directly carried by the barge, it is desirable to provide structural parts which rigidly connect two or more caissons to hold the same in fixed parallel relationship. Thus structural brace or strut members 22 and 23 are shown rigidly connecting the extremities of the column portions 12, to form in effect a complete rigid frame.

During a positioning operation it is desirable to provide two or more control cables 24 and 26 to facilitate control over movements of the caissons relative to the barge. These cables can be attached to the lower member 22 and to cleats or like means on the ends of the barge.

In order to facilitate placement of caissons in alignment with and in fixed spaced relationship to caissons previously positioned, the barge is provided with a pair of outrigger devices 27. Each of these devices provide locating abutment surfaces 28 and 29, which are adapted to be brought into engagement with previously positioned caissons.

Operation of the apparatus described above, and the steps involved in practicing my method, are as follows: The caissons are first fabricated on shore, after which they are connected together in pairs by the rigid members 22 and 23. Such a connected pair or frame is then engaged by the clamping devices 21 with the base portions floating substantially in the manner illustrated in Figure 1. The barge is now towed to the desired location, after which it is headed into any prevailing wind or current, and held against horizontal movement as by use of the cables 18. The compartments of the caissons are progressively flooded, commencing preferably with the lowermost compartments, and then proceeding progressively to the compartments nearest the column portions 12. As the flooding proceeds the base portions 11 gradually sink into the water with turning of the caissons about the axis of the trunnions 19 (Figure 1). Eventually the caissons will reach the vertical position illustrated in dotted lines in Figure 1, with the base portions 11 adjacent to the bottom formation. Vertical position can be indicated by suitable means such as conventional clinometers.

When the caissons have been turned to vertical position the clamping devices 21 are loosened to permit sliding movement of the column portions 12 through the same. Flooding now proceeds to cause lowering of the caissons upon the bottom formation. Assuming that the bottom formation consists of sand 31 beneath a layer of mud or silt 32, it is desirable to employ hydraulic jetting to facilitate sinking of the caissons, and additional hydraulic jetting and pumping to displace the mud or silt from below the caissons and thus enable the caissons to be firmly seated upon the sand formation 31 substantially as illustrated in Figure 3. Hydraulic jetting can be carried out by the use of suitable hydraulic nozzles (not shown) spaced horizontally and vertically on the extension of the base portions 11, and also located in the lower peripheral edges of the base portions 11. Such nozzles are connected to suitable piping through which water can be supplied from the barge. Mud or silt can be removed by pumps connected by pipes extending through the caissons and communicating with the conical shaped base cavities indicated at 30. After positioning of the caissons these cavities can be filled with ballast such as sand or gravel or a tremie concrete plug.

During turning and lowering of the caissons the control lines 24 and 26 can be used to aid in holding the caissons against overtravel or pendulum movements.

After the two caissons have been firmly seated upon the bottom formation, the clamping devices 21 are completely disengaged from the column portions 12, after which the barge is removed, leaving the two caissons with their connecting structures as illustrated in solid lines in Figure 4. Assuming now that one desires to place two additional caissons in alignment with and in predetermined spaced relationship to the previously positioned caissons, the two additional caissons, with connecting brace or strut members 22 and 23 are engaged by the clamping devices 21, and the barge again towed to the location where the first caissons have been erected. The outrigger devices 27 are now engaged with the column portions 12 of the previously positioned caissons, as illustrated in Figure 4, which serves to establish a predetermined fixed relation between the previously positioned caissons and the axis of the trunnions 19. The second two caissons are now progressively flooded to swing them to vertical position substantially as illustrated in Figure 4, after which hydraulic jetting is applied together with further flooding to lower these caissons in firm engagement with the formation 31. During such operations the outriggers 27 are held in firm engagement with the column portions 12. In the same manner as just described one or more additional pairs of caissons can be positioned in predetermined relationship with the preceding pair.

After removal of the clamping devices 21 from the last pair of caissons, and after the barge has been removed, a working platform or other superstructure can be readily secured to the upper ends of the caissons. Such a superstructure can consist of previously fabricated sections which can be readily secured to the members 23. If desired the lower cross-members 22 can be rigidly connected together for further strengthening. In the final structure the caissons are accurately aligned with respect to each other, and there is accurate predetermined spacing between the centers of the columns, as measured in a horizontal direction.

My apparatus can also be used to advantage where it is desired to shift caissons from one position to another, or to salvage the same for further use. Thus after the working platform or other superstructure has been removed, the barge is positioned between the caissons substantially as shown in Figure 4, after which the clamping devices 21 are slidably engaged with the column portions 12, and water progressively pumped from the compartments of the base portions 11. As the caissons gradually become more buoyant, they initially elevate from the bottom formation, and then gradually turn to substantially horizontal floating position. Raising the caissons from the bottom formation may be assisted by hydraulic jetting. After one set of caissons has been elevated and removed, the second set or other sets are likewise elevated and removed by the same procedure.

In the foregoing my apparatus has been described as applied to the placement of caissons in pairs. In addition to such application the apparatus can be used to position a single caisson, where, for example, one caisson is desired for supporting a superstructure, or where a single caisson is being positioned in fixed spaced relation to a previously positioned caisson. Also instead of positioning the caissons in pairs, three or more caissons can be connected together in the same manner as two caissons, with suitable modification of the barge construction. Thus assuming that three caissons are connected by cross struts, with the axes of the caissons in a common plane, two barges can be joined and provided with three clamping devices and a central slot to accommodate the central caisson.

It will be evident from the foregoing that I have provided an apparatus and method which can be used for the accurate placement of caissons. Thus the apparatus greatly facilitates the erection of offshore working platforms, such as are suitable for offshore well drilling operations, offshore storage of oil or other products, anchorages for ship to shore cableways or conveyors, offshore lighthouses, direction finder and loran stations. Also the apparatus can be used to advantage in the erection of bridge piers, causeways and like support structures.

I claim:

1. In apparatus for the placement of caissons of the type adapted to be made buoyant for floating to the location desired and to be flooded for positioning the same on an underlying bottom; a barge, a clamping device, for releasably engaging said caisson, shaft means to which said device is secured, a trunnion means serving to journal said shaft for pivotal movement of said device about a horizontal axis and means for mounting the trunnion means on the barge to position said clamping device in spaced relation to one side of the barge as viewed in plan.

2. In apparatus for the placement of caissons of the type adapted to be made buoyant for floating to the location desired and to be flooded for positioning the same on an underlying bottom; a barge, a clamping device for releasably engaging said caisson, said device adapted to either firmly grip or permit sliding movement of the caisson therethrough, a shaft to which said device is secured, a trunnion serving to journal said shaft for pivotal movement of said device about a horizontal axis, and means for mounting the trunnion means on the barge to position said clamping device in spaced relation to one side of the barge as viewed in plan.

3. In apparatus for the placement of caissons, where the caissons are of the type adapted to be made buoyant for floating to the location desired and to be flooded for positioning the same on an underlying bottom, said caissons also having a lower base portion adapted to be positioned upon the bottom and an upper column portion of substantial length; a barge, a pair of clamping devices adjacent opposite sides of the barge for releasably engaging said column portion of a caisson, said devices adapted to either firmly grip or permit sliding movement of the caisson therethrough, shaft means secured to said devices, trunnion means serving to support said shaft means for pivotal movement of said devices about a horizontal axis, and means for mounting the trunnion means on the barge to position said clamping devices in laterally spaced relation to the opposite sides of the barge as viewed in plan.

4. In apparatus for the placement of two caissons, where the caissons are each of the type adapted to be buoyant for floating to the location desired and to be flooded for positioning of the same on an underlying bottom, each caisson also having a lower base portion adapted to be positioned upon the bottom and an upper column portion of substantial length, with structural members serving to rigidly connect the upper and lower ends of the column portions to maintain said column portions in parallel relationship; a barge having a width less than the distance between said column portions, clamping devices on opposite sides of the barge adapted to engage said column portions, shaft means to which said devices are secured, aligned trunnion means for said shaft means and adapted to pivotally support said clamping devices for pivotal movement of the same about a horizontal axis, and means for supporting said trunnions in the barge to position the clamping devices in laterally spaced relation to the sides of the barge as viewed in plan, said clamping devices being adapted to either firmly grip or permit sliding movement of the caissons therethrough.

5. In apparatus for the placement of caissons where the caisson is of the type adapted to be made buoyant for floating to the location desired and to be flooded for positioning of the same on an underlying bottom, said caisson also having a lower base portion and a cylindrical column portion of substantial length; a clamping device adjacent one side of the barge and adapted to engage said column portion, a horizontal shaft to which said device is secured, trunnion means serving to journal said shaft and to support said clamping device for pivotal movement about a horizontal axis, means serving to mount the trunnion means on the barge with said clamping device spaced laterally from the adjacent side of the barge as viewed in plan, and means carried by the barge and having a predetermined fixed relation to said trunnion means for engaging a previously positioned caisson to thereby maintain a predetermined relationship between such previously positioned caisson and the caisson carried by said clamping device.

6. In apparatus for the placement of caissons, where each caisson is of the type adapted to be made buoyant for floating to the location desired and to be flooded for positioning of the same on an underlying bottom, each caisson comprising a base portion and a column portion of substantial length; a barge, clamping devices adjacent opposite sides of the barge and adapted to releasably engage the column portions of two of such caissons, shaft means secured to said devices, trunnions serving to journal said shaft means and to support said clamping devices for pivotal movement about a horizontal axis, means serving to mount the trunnion means on the barge with said clamping means spaced laterally from the sides of the barge as viewed in plan, and means carried by the barge in spaced relationship with said clamping devices and adapted to have abutting relationship with two of the previously positioned caissons, said last means serving to provide a predetermined relationship between caissons engaged by said clamping devices and said previously positioned caissons.

7. In a method for the placement of elongated caissons of the type adapted to be made buoyant for floating with a barge to the location desired and to be flooded for positioning the same on an underlying bottom; said method comprising attaching a floating caisson on its side to one side of the barge, moving the barge and the floating caisson to the location desired, progressively flooding the base end of said caisson to cause the same to turn from generally horizontal to vertical position about a horizontal axis on the barge, completing lowering and positioning of the caisson upon the underlying bottom, and then disengaging the barge from the caisson.

8. A method for the placement of elongated caissons of the type adapted to be made buoyant for floating with a barge to the location desired and to be flooded for positioning the same on an underlying bottom; said method comprising rigidly connecting two of said caissons in spaced relation, attaching the floating caissons to a barge whereby each caisson occupies a generally horizontal position adjacent the sides of the barge, moving the barge and the floating caissons to the location desired, progressively flooding the base ends of said caissons to thereby cause both caissons to simultaneously move from generally horizontal to vertical positions, said movement being about a horizontal axis on the barge, completing positioning of the caissons upon the bottom formation, and then disconnecting the caissons from the barge.

9. A method as in claim 8 together with the step of maintaining the barge in substantially fixed relation with previously positioned caissons to thereby establish predetermined positioning and alignment of all of said caissons with respect to each other.

CARL A. TREXEL.

References Cited in the file of this patent

UNITED STATES PATENTS

| Number | Name | Date |
|---|---|---|
| 851,332 | Waterhouse | Apr. 23, 1907 |
| 2,422,168 | Kirby | June 10, 1947 |

FOREIGN PATENTS

| Number | Country | Date |
|---|---|---|
| 23,582 | Netherlands | Feb. 16, 1931 |